(12) United States Patent
Liang

(10) Patent No.: US 10,860,961 B2
(45) Date of Patent: Dec. 8, 2020

(54) AUTOMATIC COMPUTER PREDICTION OF RESOURCE ATTRITION

(71) Applicant: XACTLY CORPORATION, San Jose, CA (US)

(72) Inventor: Shenshen Liang, Menlo Park, CA (US)

(73) Assignee: Xactly Corporation, San Jose, CA (US)

( * ) Notice: Subject to any disclaimer, the term of this patent is extended or adjusted under 35 U.S.C. 154(b) by 192 days.

(21) Appl. No.: 16/057,449

(22) Filed: Aug. 7, 2018

(65) Prior Publication Data

US 2020/0050984 A1    Feb. 13, 2020

(51) Int. Cl.
*G06Q 10/06* (2012.01)
*G06Q 10/10* (2012.01)

(52) U.S. Cl.
CPC ..... *G06Q 10/0635* (2013.01); *G06Q 10/1053* (2013.01)

(58) Field of Classification Search
None
See application file for complete search history.

(56) References Cited

U.S. PATENT DOCUMENTS

| | | | |
|---|---|---|---|
| 2004/0162748 A1* | 8/2004 | Vogel | G06Q 10/06312 705/7.13 |
| 2011/0208557 A1* | 8/2011 | Gonzalez Diaz | G06Q 10/06311 705/7.14 |
| 2011/0307413 A1* | 12/2011 | Dutta | G06Q 10/105 705/348 |
| 2014/0279628 A1* | 9/2014 | Straznitskas | G06Q 10/105 705/320 |
| 2017/0236081 A1* | 8/2017 | Grady Smith | G06Q 10/067 705/7.36 |

* cited by examiner

*Primary Examiner* — Thomas L Mansfield
(74) *Attorney, Agent, or Firm* — Baker Botts L.L.P.

(57) ABSTRACT

A computer-implemented method is disclosed. The method comprises using a plurality of digital features corresponding to each of a plurality of resources to build a digital model for predicting resource attrition. Each digital feature has at least a level attribute, an interval attribute, and an aggregate attribute. At least one of the plurality of digital features has a level attribute having a value of corporate. At least one of the plurality of digital features has an interval attribute having a value of until the end of the year. The output of the digital model is whether a resource is disassociated from a corresponding business entity within a certain period of time from the corresponding time point.

20 Claims, 6 Drawing Sheets

FIG. 3

| Ref. No. | Feature Name 380 | Level 382 | Unit 384 | Interval 386 | Score 388 |
|---|---|---|---|---|---|
| 302 | BUSINESS_ID | Business entity | Other/ID | | 97351.2 |
| 304 | COUNT_MONTHS_GOT_PAYMENT | Individual | Number of months | Per year | 71870.19 |
| 306 | HOME_CITY | I | Other/city | | 61716.91 |
| 308 | COUNT_MONTHS_QUOTA_PAID | I | N of months | Per month/year | 53805.71 |
| 310 | COMP_AVG_MONTH_PAYEECOUNT | B | N of people | Per month/year | 38328.02 |
| 312 | COMP_MIN_MONTH_PAYEECOUNT | B | N of people | Per month/year | 34431.98 |
| 314 | COMP_MAX_MONTH_PAYEECOUNT | B | N of people | Per month/year | 34032.05 |
| 316 | HIRE_AS_OF_DATE | I | N of months | Till now | 18397.35 |
| 318 | MAX_CREDIT_AMT_USD | I | Amount of money | Per month/year | 16490.85 |
| 320 | MAX_MONTH_PAYMENT | I | A of money | Per month/year | 16469.75 |
| 322 | COUNT_UNIQ_MGR_ID | I | N of managers | Till now | 16445.2 |
| 324 | HOME_STATE_PROVINCE | I | Other/state | | 15616.72 |
| 326 | INDUSTRY | B | Other/industry | | 13634.88 |
| 328 | YEAR_PAYMENT | I | A of money | Per year | 13024.94 |
| 330 | HOME_COUNTRY_CODE | I | Other/code | | 9199.494 |
| 332 | TITLE_CATEGORY_YR_END | I | Other/Title | | 7155.323 |
| 334 | PR_TARGET_USD | I | A of money | Per year | 5773.383 |
| 336 | COUNT_MONTH_IN_TITLE_TIL_DEC | I | N of months | Till year end | 4531.622 |
| 338 | COUNT_MONTH_EMPLOYED_TIL_DEC | I | N of months | Till year end | 4097.894 |
| 340 | COUNT_MAX_MONTH_ORDER | I | N of orders | Per month/year | 3541.284 |
| 342 | SALARY_USD | I | A of money | Per year | 3520.782 |
| 344 | COUNT_UNIQ_TITLE_NAME | I | N of titles | Till now | 3187.819 |
| 346 | LAST_PAYMENT_UNTIL_YR_END | I | N of months | Till year end | 2790.734 |
| 348 | MAX_MONTHS_IN_TITLE | I | N of months | Till now | 2244.6 |
| 350 | MIN_MONTH_PAYMENT | I | A of money | Per month/year | 2091.196 |
| 352 | LAST_CREDIT_UNTIL_YR_END | I | N of months | Till year end | 2025.123 |
| 354 | LAST_QUOTA_PAID_UNTIL_YR_END | I | N of months | Till year end | 1812.454 |
| 356 | LAST_INCENT_PAY_UNTIL_YR_END | I | N of months | Till year end | 1797.686 |
| 358 | ANNUAL_REVENUE | B | A of money | Per year | 1343.957 |
| 360 | SUM_QUOTA_AMT_USD | I | A of money | Per year | 1166.513 |

| Node Index | 442 Node Value | 444 Left Branch Value | 446 Left Node Index | 448 Right Branch Value | 450 Right Node Index | 452 Leaf? |
|---|---|---|---|---|---|---|
| 402 | Male? | Yes | 404 | No | 406 | No |
| 404 | Sale > $100K | Yes | 408 | No | 410 | No |
| 406 | From US, Canada, or Mexico? | Yes | 412 | No | 414 | No |
| 408 | 30% Leaving | | | | | Yes |
| 410 | 55% Leaving | | | | | Yes |
| 412 | 15% Leaving | | | | | Yes |
| 414 | 60% Leaving | | | | | Yes |

AUTOMATIC COMPUTER PREDICTION OF RESOURCE ATTRITION

FIELD OF THE DISCLOSURE

The present disclosure generally relates to the technical fields of digital computing devices and data analytics. Another technical field is programming techniques for digital computers relating to automation machine interpretation of resource data and identifying attrition indicators from resource data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Resource attrition is an issue that every employer may confront and may include the unexpected resignation of an employee from an enterprise. Many factors may contribute to an employee's decision to continue or stop working for the employer. While enterprises typically maintain digital data storage of databases and other sources of data that describe aspects of the enterprise, its personnel and their performance in exhaustive detail, present technology has not provided efficient mechanisms for machine identification of factors in existing data regarding the employee or the employer. A distinct technical issue is how to program computers to automatically identify datasets that predict resource attrition. It would be helpful to automatically analyze these data to generate and output other data specifying how specific factors interact to influence an employee's decision, prevent resource attrition, and retain valuable employees.

BRIEF DESCRIPTION OF THE DRAWINGS

In the drawings:

FIG. 3 illustrates an example table showing a list of features to be included in the training data for predicting resource attrition.

DETAILED DESCRIPTION

Figure 1:
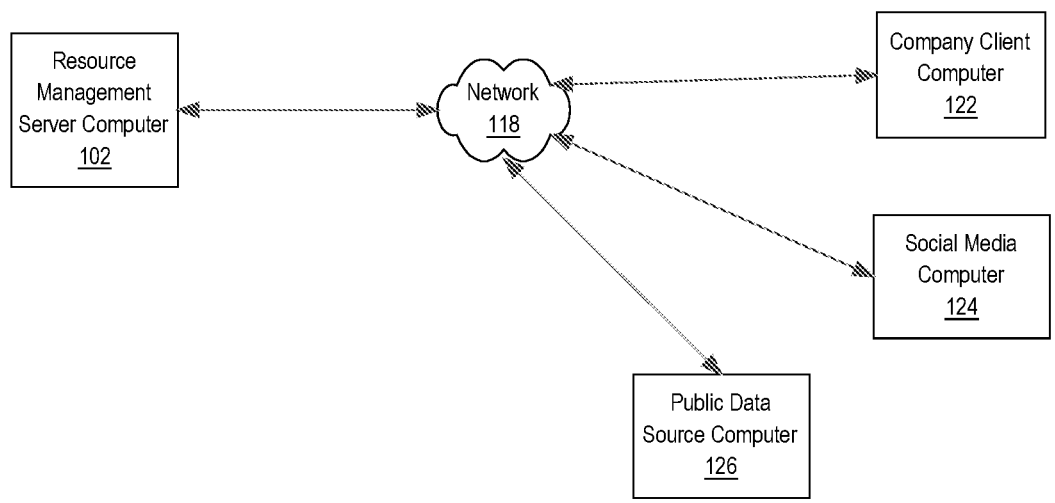
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTIONS
    4.1. COLLECTING TRAINING DATA
    4.2. BUILDING RESOURCE ATTRITION MODEL
    4.3. EXECUTING RESOURCE ATTRITION MODEL
    4.4. ANALYZING OR PRESENTING MODEL EXECUTION RESULTS AND RELATED DATA
5. EXAMPLE COMPUTER-IMPLEMENTED PROCESSES
6. IMPLEMENTATION EXAMPLE—HARDWARE OVERVIEW
7. EXTENSIONS AND ALTERNATIVES 1. General Overview In some embodiments, computer-implemented techniques are provided for managing resource attrition based on digital human resource and related data. A resource management server computer or server is programmed or configured to first collect and identify the digital human resource and related data from one or more sources. The digital human resource and related data may comprise relatively comprehensive raw data over a certain time range concerning multiple employees associated with one or more employers. The digital human resource and related data may cover various aspects that may contribute to an employee's resignation or disassociation from the employer. In general, the digital human resource and related data may include data managed by an employer, such as an employee's salaries, commissions, benefits, work products, or schedules. The digital human resource and related data may include additional data managed by an employer, such as the employer's revenue, management structure, business initiatives, or merger or acquisition activities. Additional digital human resource and related data, some of which may be publicly available, may reveal less tangible aspects, such as an employee's attendance, self or manager reviews, job histories, job search activities, health condition, family obligations, other interests or hobbies, or other job opportunities. Furthermore, the human resource and related data can be differentiated by time, location, or other attributes or interpreted at different aggregate levels. For example, the data near the end of the year, when the total compensation is determined, and the data for the rest of the year may contribute differently to an employee's employment decision. For further example, the identity of the current manager and the number of managers during the past year may also be associated with different degrees of significance to an employee.

In some embodiments, the server can be configured to start with the relatively comprehensive relevant raw data. The server can be configured to then automatically select a set of features or enable selection of a set of features for building a digital resource attrition model that produces an indicator related to whether an employee would be disassociated from an employer within a certain period of time. The features can include various attributes, such as an aggregate attribute that specifies aggregating raw data or an interval level that specifies filtering raw data outside a time interval.

In some embodiments, the server is programmed or configured to also obtain the employment status of each of the multiple employees at a certain time point, which can be within or after the time range.

In some embodiments, the server is programmed or configured to then build the digital resource attrition model using the selected features for the multiple employees and the corresponding employment status data. A "model" in this context refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. The server can be configured to store the digital resource attrition model in a memory for subsequent execution. Alternatively, the server can be configured to transmit the digital resource attrition model to a device associated with an employer for subsequent execution by the device.

In some embodiments, the server is programmed or configured to then receive a plurality of features corresponding to a specific employee and a specific time point from a device of a specific employer of the specific employee. The server is programmed to then execute the digital attrition resource model on the plurality of features to obtain an indicator related to whether the specific employee will quit within the certain period of time from the specific time point. The server is programmed to then transmit the execution result to the device.

The server can be configured to prepare recommendations for reducing resource attribution based on the execution result or additional data. For example, when the execution result indicates that there is an 80% probability that the specific employee would quit within six months, the server can be configured to determine that the employer wishes to retain this employee beyond six months based on the employee's job performance or other factors. The server can be configured to further suggest changing the employee's manager upon determining that the likelihood of quitting is much lower for a group of employees that are similar to the specific employee in certain aspects but report to a different manager.

The resource management server computer produces technical benefits. The server enables identification of specific types of digital data, out of many possible types, that might have contributed to an employee's employment decision. Such automatic data filtering and selection reduces requirements for computing resources and time to desirable results. The server further transforms digital raw human resource and related data to computational resource attrition models and ultimately employment status indicators and recommendations for reducing resource attrition. Such data transformation is based on a set of unique rules and produces specific, useful results.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements connected in various manners.

In some embodiments, the networked computer system comprises a resource management server computer (server) 102, a company client computer 122, a social media computer 124, and a public data source computer 126, which are communicatively coupled directly or indirectly via one or more networks 118. The different components of the networked computer system can reside in the same or different computer network domains.

In some embodiments, the server 102 broadly represents one or more computers, virtual computing instances, and/or instances of a server-based application that is programmed or configured to host or execute functions including but not limited to collecting human resource and related data, using the relevant human resource and related data to build a digital model that predicts whether a certain resource associated with a business entity at a reference point will be disassociated from the business entity within a certain period from the reference point, and using the digital resource attrition model to make predictions for a specific resource who is currently associated with a specific business entity. A "resource" in this context may be a person such as an employee, a contractor, capital equipment or other resources. The server 102 can comprise a server farm, a cloud computing platform, a parallel computer, special-purpose hardware, or any other computing facility with sufficient computing power in data processing, data storage, and network communication for the above-described functions.

In some embodiments, the company client computer 122, which is associated with a company client of the server, is programmed to provide the main human resource and related data, such as personal data related to salaries, commissions, benefits, or work products, or corporate data related to management structure, industry reputation. The social media computer 124, which is associated with a social media network, may be programmed to provide additional human resource and related data, such as personal data related to job search activities or employer reviews or corporate data of recruiting activities and business initiatives. The public data source computer 126, which may include any other provider of public data, may be programmed to also provide additional human resource and related data, such as personal data of employment histories, birthdays, or hometowns, or corporate data of size or annual revenue. In certain embodiments, the company client computer 122 is incorporated into the server 102.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link In some embodiments, the server 102 is programmed or configured to retrieve human resource and related data and employment status data, from one or more company client computers 122, one or more social media computers 124, or one or more public data source computers 126. The server 102 is programmed or configured to then build one or more digital resource attrition models based on the human resource and related data and employment status data. The server 102 is programmed or configured to store the digital resource attrition models for subsequent use.

Alternatively, each digital resource attrition model can be transmitted to a company client computer 122 for subsequent use by the company client computer 122. The server 102 is programmed or configured to then receive additional human resource and related data corresponding to one or more specific individuals currently associated with a specific business entity from a corresponding company client computer 122. The server 102 is programmed or configured to further execute the digital resource attrition model on the additional human resource and related data to generate a prediction related to whether each of the one or more specific individuals is disassociating from the specific business entity within a certain period of time. The server 102 is programmed or configured to then transmit the execution result to the corresponding company client computer 122.

3. Example Computer Components

Figure 2:
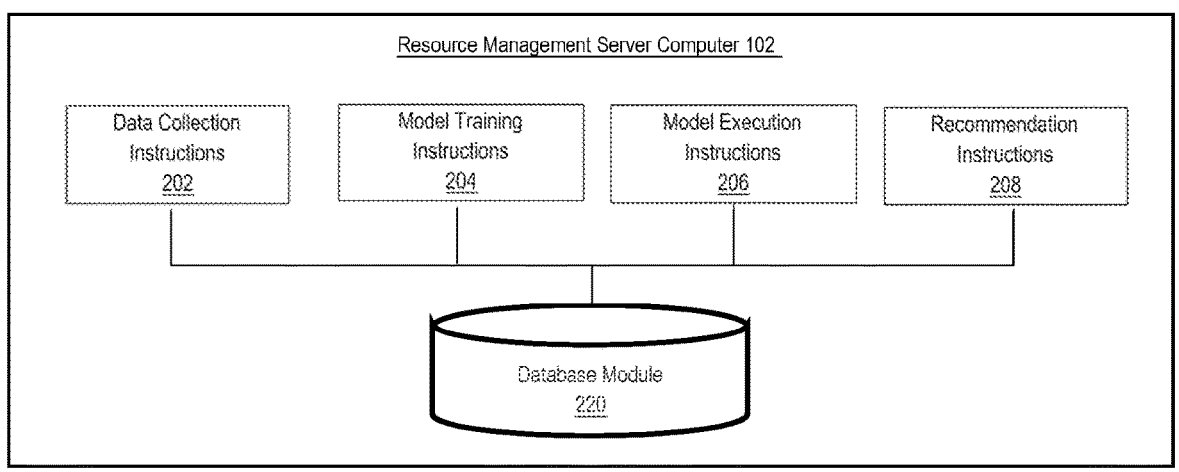
FIG. 2 illustrates example computer components of a resource management server computer.

FIG. 2 illustrates example computer components of a resource management server computer. FIG. 2 is shown in simplified, schematic format for purposes of illustrating a clear example and other embodiments may include more, fewer, or different elements connected in various manners. Each of the functional components such as the modules identified herein can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 comprises a data collection component having data collection instructions 202, a model training component having model training instructions 204, a model execution component having model execution instructions 206, and a recommendation component having recommendation instructions 208. In addition, the server 102 comprises a database module 220.

In some embodiments, the data collection instructions 202 allow retrieving human resource and related data as well as employment status data from a company client computer 122, a social media computer 124, or a public data source computer 126, and communicating the retrieved data to the database module 220. The human resource and related data typically includes relevant data for an individual up to a reference time point, including certain aspects of a business entity with which the individual is associated at the reference time point. The employment status data indicates whether an individual associated with a business entity at the reference point is disassociated from the business entity within a certain period from the reference time point.

In some embodiments, the model training instructions 204 allow constructing a digital resource attrition model based on the relevant human resource and related data and employment status data and communicating the digital resource attribution model to the database module 220. Based on certain human resource and related data for a certain individual up to one time point, the digital resource attrition model predicts the certain individual's employment status within the certain period of time from that one time point. The model training instructions 204 can also allow communicating the digital resource attribution model to a company client computer 122.

In some embodiments, the model execution instructions 206 allow receiving specific human resource and related data for a specific individual up to a specific time point, executing the digital resource attrition model using the specific human resource and related data, and obtaining a prediction of the specific individual's employment status within the certain period of time from the specific time point. The model execution instructions 206 can also allow communicating the prediction or other execution results to the database module 220 or further transmitting the prediction or other execution results to the source of the specific human resource and related data.

In some embodiments, the recommendation instructions 208 allow further analyzing the execution result or linking the execution result with additional data to prepare recommendations for reducing resource attrition. The additional data can include human resource and related data for additional individuals or execution results from additional resource attrition models. The recommendation instructions 208 can also allow communicating the recommendations to the database module 220 or further transmitting the recommendations to the source of the specific human resource and related data.

In some embodiments, the database module 220 is programmed or configured to manage relevant data structures and store relevant data for functions performed by the server 102. The relevant data may include human resource and related data, employment status data, digital resource attrition models, model execution results, or recommendations based on model execution results.

4. Functional Descriptions 4.1 Collecting Training Data

In some embodiments, the server 102 is programmed to collect training data for building a resource attrition model. The resource attrition model provides an indicator related to whether an individual currently associated with a business entity will be disassociated from the business entity within a certain period of time.

In some embodiments, the training data can include a plurality of features for each individual associated with a business entity, such as an employee or a contractor of a company or corporation. The plurality of features would correspond to a time point during the period when the individual is associated with the business entity. The training data can further include an outcome for the individual, such as being associated with or disassociated from the business entity, within a certain period of time from the time point. The training data can be collected from a device associated with the business entity, a device associated with the individual, or a third-party data source.

In some embodiments, each of the plurality of features may include certain attributes. One attribute of a feature is the level, and the possible values include a business entity (or department or a group thereof) or an individual. For example, the feature of the industry in which the business entity operates is at the business entity level, while the feature of the home city of the individual is at the individual level. For further example, the feature of the annual revenue can be at the business entity level, while the feature of the yearly salary can be at the individual level. Another attribute of a feature is the category, and the possible values include individual qualifications (skills, past experience), business profiles, salaries, commission structures (quota, credits), work products (orders, sales, productivity), positions (titles, reporting structures), or individual activities (job searches, complaints). For example, the feature of when the last incentive was paid falls in the salaries category, while the number of unique managers falls into the positions category. Another attribute of a feature is the unit, and the possible values include number of people, number of months, or amount of money (or monthly payment). For example, the feature of the length of hire can have a unit of the number of months, and the feature of the annual revenue can have a unit of the amount of money.

Yet another attribute of a feature is the interval, and the possible values include per month, per quarter, each year, monthly over a year, until the end of the year, or until now. For example, the feature of the number of months having a particular title before December can have an interval of until the end of the (current or last) year, and the feature of the minimum monthly payee count can have an interval of monthly over a year. Yet another attribute of a feature is the aggregate, and the possible values include total, minimum, maximum, average, medium, or number of changes. For example, the longest period in a particular position can have an aggregate of maximum, and the number of unique managers can have an aggregate of total. In general, each of the plurality of values can have null as the value of an attribute. The null value can apply when the attribute is inapplicable to the feature or when the value of the attribute is unavailable.

FIG. 3 illustrates an example table showing a list of features to be included in the training data for predicting resource attrition. Each row corresponds to a feature. The column 380 indicates the name of the feature. The column 382 indicates the level attribute of the feature. The column 384 indicates the unit of the feature. The column 386 indicates the interval of the feature. The column 388 indicates a score assigned to the feature, which may be provided by a source of the feature data or computed by the server 102. The score may reflect a degree of contribution of the feature to predicting resource attrition or specifically whether an individual will continue or stop working for a business entity.

In some embodiments, the feature 302, the ID of the business entity, has a level of business entity (B), a unit of ID, and an interval of null (or now). The feature 304, the number of months for which the individual received a salary payment in a (current or past) year, has a level of individual (I), a unit of number of months, and an interval of per year. The feature 306, the home city of the individual, has a level of individual, a unit of city, and an interval of null. The feature 308, the number of months in a year in which the quota achieved by the individual was paid, has a level of individual, a unit of number of months, and an interval of per year.

The feature 310, the average number of monthly payees of the business entity in a year, has a level of business entity, a unit of number of people, and an interval of monthly over a year (or a unit of number of people per month and an interval of per year). The feature 312, the minimum number of monthly payees of the business entity in a year, has a level of business entity, a unit of number of people, and an interval of per month over a year. The feature 314, the maximum number of monthly payees of the business entity in a year, has a level of business entity, a unit of number of people, and an interval of per month over a year. The feature 316, the length of hire, has a level of individual, a unit of number of months, and an interval of until now. The feature 318, the maximum amount of credit given to the individual, has a level of individual, a unit of amount of money, and an interval of per month over a year.

The feature 320, the maximum amount of monthly payment given to the individual, has a level of individual, a unit of amount of money, and an interval of per month over a year. The feature 322, the number of unique managers the individual has had, has a level of individual, a unit of number of managers, and an interval of until now. The feature 324, the home state or province of the individual, has a level of individual, a unit of state, and an interval of null. The feature 326, the industry in which the business entity operates, has a level of business entity, a unit of industry, and an interval of null. The feature 328, the total amount of yearly payment given to the individual, has a level of individual, a unit of amount of money, and an interval of per year.

The feature 330, the home country of the individual, has a level of individual, a unit of country, and an interval of null. In some embodiments, the feature 332, the category of title of the individual at the end of a year, has a level of individual, a unit of title category, and an interval of null (or end of year). The feature 334, the amount of personal target for the year set by the individual, has a level of individual, a unit of amount of money, and an interval of per year. The feature 336, the amount of time in which an individual has or will have had a title by the end of a year, has a level of individual, a unit of number of months, and an interval of until the end of year. The feature 338, the length of time in which an individual was employed by the end of a year, which could be less than the length of hire for a part-time employee, has a level of individual, a unit of number of months, and an interval of until the end of the year.

The feature 340, the maximum monthly number of orders produced by an individual in a year, has a level of individual, a unit of number of orders, and an interval of per month over a year. The feature 342, the individual's salary, has a level of individual, a unit of amount of money, and an interval of per year. The feature 344, the number of unique titles the individual has had, has a level of individual, a unit of number of titles, and an interval of until now. The feature 346, when the last salary payment was made to the individual by the end of the year, has a level of individual, a unit of number of months, and an interval of until end of the year. The feature 348, the longest period of time the individual was in any title, has a level of individual, a unit of number of months, and an interval of until now.

The feature 350, the minimum monthly salary payment the individual has received, has a level of individual, a unit of amount of money, and an interval of per month over a year. The feature 352, when the last credit was given to the individual by the end of a year, has a level of individual, a unit of number of months, and an interval until the end of the year. The feature 354, when the last achieved quota was paid to the individual by the end of a year, has a level of individual, a unit of number of months, and an interval until the end of the year. The feature 356, when the last incentive was paid to the individual by the end of a year, has a level of individual, a unit of number of months, and an interval until the end of the year. The feature 358, the annual revenue made by the business entity, has a level of business entity, a unit of amount of money, and an interval per year.

The feature 360, the sum of quota achieved by the individual in a year, has a level of individual, a unit of amount of money, and an interval of per year.

In some embodiments, the server 102 is programmed to receive raw data that is relative comprehensive in scale and conversion information for converting the raw data into training data. The conversion may involve selection, filtering, or transformation. In certain embodiments, the raw data may have only the datatype attribute indicating what the data is and the level attribute indicating whether the data is at the individual level or at the business entity level over a long time range. The conversion information can then indicate additional attributes to be applied to the raw data. For example, the raw data may contain, for each employee of a company, the amount of each monthly salary payment over the last five years. The conversion information may then indicate that the first feature of the maximum monthly salary payment last year will have amount of money for the unit attribute, maximum for the aggregate attribute and over a year for the interval attribute, while the second feature of the total number of months receiving salary payments last year will have number of months for the unit attribute, total for the aggregate attribute, and per year for the interval attribute.

In some embodiments, to collect the conversion information, the server 102 is programmed to cause presentation, by a device associated with a business entity, of a graphical user interface (GUI) for selecting which features to be included in the training data. The GUI can enable adding a feature definition. For that feature definition, the GUI can show a field for each of a number of attributes. For each attribute, the GUI can show a list of default values. For example, by selecting salaries as the category, individual as the level, amount of money as the unit, total as the aggregate, and per year as the interval, the feature definition of an individual's annual salary is set up. For further example, by selecting quota payments as the category, individual as the level, number of months as the unit, last as the aggregate, and until the end of the year as the interval, the feature definition of when (number of months until the end of the year) the last payment for the achieved quota was paid to the individual is set up. In this way, many different features can be generated from the same set of raw data regarding business entities or individuals. The GUI can also enable assigning a score or a priority to an added feature definition, which can be incorporate into the resource attrition model. Alternatively, such scores can be automatically derived during the development of the resource attrition model, as further discussed below.

In some embodiments, the server 102 is programmed to collect or update the training data according to a specific schedule, upon specific user request, or in response to notifications from the devices associated with business entities or individuals or public data sources that new data is available for training purposes. As the training data is updated, the resource attrition model can also be updated.

4.2 Building Resource Attrition Model

In some embodiments, the server 102 is programmed to build a resource attrition model from the training data, which contains a plurality of features for each for a plurality of individuals and associated outcomes or employment status data. The resource attrition model produces an indicator for a certain individual associated with a certain business entity related to whether the certain individual will be disassociated from the certain business entity within a certain period of time. The indicator can indicate a numerical likelihood that the specific individual leaves the business entity, or a categorical prediction. The resource attrition model can be implemented by any statistical or categorical classification algorithm known to someone skilled in the art, such as k-nearest neighbor clustering, logistic regression, support vector machines, decision trees, gradient boosting trees, or neural networks. In certain embodiments, the resource attrition model implemented as a decision tree is built using the R package and specifically the rpart function, and the parameters can be tuned by the caret, pROC, or Presence-Absence libraries with the R package. Similarly, the resource attribution model implemented specifically as a gradient boosting tree can be built using the gbm function, and one implemented as a logistic regression model can be built using the glmnet function.

In some embodiments, the server 102 is programmed to build a single resource attrition model using all the training data, or multiple resource attrition models based on different criteria. For example, a resource attrition model can be associated with a business entity, a department within a business entity, or another attribute of a business entity, such as the industry or annual revenue. A resource attrition model can also be associated with an attribute of an individual, such as age, position, or annual compensation.

4.3 Executing Resource Attrition Model

In some embodiments, the server 102 is programmed to receive actual data of a plurality of features for each of one or more individuals associated with one or more business entities. For example, a company might want to know, who among the current roaster of employees is likely to leave next January. The server 102 can also be configured to receive a choice of a resource attrition model, such as one corresponding to all employees in a salary bracket associated with a business entity. The server 102 is programmed to then execute the chosen or a default resource attrition model on the actual data to generate an indicator for each of the one or more individuals. In certain embodiments, the resource attrition model built using the R package, as described above, can be run similarly using the R package and specifically the rpart.predict function.

Figures 4A, 4B:
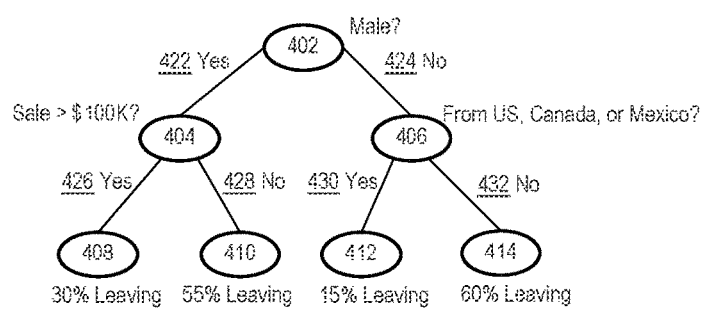
FIG. 4A illustrates an example digital resource attrition model represented as a decision tree.
FIG. 4B illustrates an example split table that corresponds to the decision tree illustrates in FIG. 4A.

FIG. 4A illustrates an example digital resource attrition model represented as a decision tree. In some embodiments, the resource attrition model represented as a decision tree can be plotted, as illustrated in FIG. 4A. Each node would correspond to either a split condition or a classification indicator. Each branch would correspond to a value of a split condition. In this example, the node 402 corresponds to the split condition of whether the individual is male or female, the node 404 corresponds to the split condition of whether the amount of sale made by the individual per year is greater than $100K, and the node 406 corresponds to the split condition of whether the individual was from U.S. Canada, or Mexico. The branches 422 and 424 respectively correspond to yes and no to the split condition 402, the branches 426 and 428 respectively correspond to yes and no to the split condition 404, and the branches 430 and 432 respectively correspond to yes and no to the split condition 406. Furthermore, the nodes 408, 410, 412, and 414 correspond to different classification indicators following different branches. For example, when an employee of a company is male and makes a sale of more than $100K a year, the likelihood of the employee leaving the company next January is 30% according to the node 408, while when the employee is female and from a country other than U.S., Canada, or Mexico, the likelihood of the employee leaving the company next January is 60% according to the node 414.

FIG. 4B illustrates an example split table that corresponds to the decision tree illustrates in FIG. 4A. In some embodiments, the traversal of a decision tree can be performed by indexing rows of a table instead of executing conditional instructions. In this example, each row of the table corresponds to a node in the tree illustrated in FIG. 4A, as shown by the value of the node index column. The other columns indicate various attributes of a node. The column 442 indicates a value of the node or the split condition corresponding to the node. The column 444 indicates a left branch corresponding to a value of the split condition and the column 446 indicates the node to which that left branch leads. Similarly, the column 448 indicates a right branch corresponding to a value of the split condition and the column 450 indicates the node to which the right branch leads. The column 452 indicates whether the node is a leaf in the decision tree, which can be implied from the lack of values for the columns 444, 446, 448, and 450.

In some embodiments, to traverse the decision tree, the server 102 can be programmed to review the first row corresponding to the root of the tree and repeatedly review additional rows based on the value of the column 446 or that of the column 450, until a row corresponding to a leaf is reached. For example, for an employee of a company is male and makes a sale of no more than $100K a year, for the row corresponding to node 402, the column 444 has a matching value and thus the next row to review is the node 404. For the row corresponding to node 404, the column 448 has a matching value and thus the next row to review is the node 410. The node 410 is a leaf with a value of a likelihood to depart form the business entity of 55%.

In some embodiments, the server 102 can be programmed to update or execute the resource attrition model on existing actual data according to a specific schedule (the specific schedule for executing the model can be different from the specific schedule for updating the model), upon user request, in response to any receipt of additional actual data, or in response to an update of the resource attrition model.

4.4 Analyzing or Presenting Model Execution Results and Related Data

In some embodiments, the server 102 is programmed to transmit or cause displaying results of executing the resource attrition model. The results can be for one or more individuals associated with a business entity. For example, the results can show the likelihood that a specific employee is leaving a company within a certain period of time. The results can also be presented at a group level with various aggregation. For example, the results can show which department of the company has the largest percentage of employees who are more likely than not to leave the company by next January. The results can also show which department of the company has more than a certain percentage of employees who are highly likely to leave the company by next January. In addition, the results can show at what time within the next year the number of employees who will leave the company for a probability more than 50% is largest.

In some embodiments, the server 102 can be programmed to transmit additional data related to the results, such as specific features that have the highest overall influence in determining the company's resource attrition, or certain features that have be used to determine that specific employees will continue or stop working for the company within the next six months. The additional data can also pertain to other similar business entities or other resource attrition models. When the likelihood that a specific employee is leaving the company is above a threshold, the server 102 can be programmed to transmit or cause display of an average value across similar business entities or similar individuals for one or more split conditions that have contributed to the determination of that likelihood. The server 102 can be programmed to further transmit or cause display of the results of executing additional resource attrition models that might also be relevant to the individual.

In some embodiments, the server 102 is programmed to review executing the resource attrition model and the results thereof to generate recommendations for reducing resource attrition. When the results show that the likelihood that an employee is leaving the company is very high based on specific split conditions, the server 102 can be programmed to identify the last split condition that has contributed to the likelihood and provide a recommendation for reducing that likelihood based on the split condition, possibly including metrics related to the two branches of the split condition. For example, for an employee falling in the node 410 in the tree illustrated in FIG. 4A, the last split condition is whether the employee makes a sale of more than $100K per year. Since the likelihood that an employee falling in the node 408 is leaving the company is lower, the server 102 can be configured to suggest helping the employee make a sale of more than $100K per year, or close to an average sale amount of the people falling in the node 408, if possible. The server 102 can generally trace the decision tree upwards and repeat the same steps. In this example, the next split condition is whether the employee is male. Because the likelihood of an employee falling in the node 408 or the node 410 is not necessarily lower than the likelihood of an employee falling in the node 412 or the node 414, and because there may not be much flexibility in the gender of an employee, this next split condition may not be particularly helpful for enhancing the recommendation.

In other embodiments, the server 102 is programmed to identify another split condition instead of the last split condition in recommending an action to prevent an employee from leaving the company. More specifically, the split condition having the highest misclassification of reduction can be identified. The misclassification associated with a split condition for a node in a decision tree is defined herein as the size percentage of the minority outcome class with respect to the training set that belongs to the node. For example, for a training set that covers 100 employees and corresponds to the root node 402 in FIG. 4A, if 30 of the 100 employees are associated with the outcome of leaving the company and the remaining 70 are associated with the outcome of staying with the company, the misclassification of the node 402 is 30%. For 40 of the employees that belong to the node 404, if 2 of the 40 employees are associated with one of the two outcomes, the misclassification of the node 404 is 5%. Similarly, if 2 of the 60 employees that belong to the node 406 are associated with one of the two outcomes, the misclassification of the node 406 is 3.3%. The misclassification reduction for the split condition for the node 402 is then computed as 30%−(2+2)/(40+60)*100%, and the misclassification reduction for the split conditions for the other nodes in the decision tree can be similarly computed. Subsequently, to make a prediction for a particular employee outside the training set, the split condition in the path traversed in the decision tree for the employee having the maximum misclassification reduction can be identified.

In some embodiments, the server 102 is programmed to also correlate the results of executing the resource attrition model with specific data that may or may not be part of the training data. The specific data may reflect the value or desirability of an employee and can be used to determine whether to provide a recommendation for retaining the employee or adjust the nature of the recommendation. For example, when an employee falling in the node 408 has achieved a top sale amount within the company (and thus greater than $100K), the company might have a strong desire to keep the employee. To address the likelihood of 30%, the decision tree might not provide further insight and the server 102 may be configured to suggest considering additional incentives for the employees. For further example, for an employee falling in the node 410, when the company has made it a top priority to increase the percentage of its female workforce, the server 102 can be configured to provide no recommendation for retaining the employee.

5. Example Computer-Implemented Processes

Figure 5:
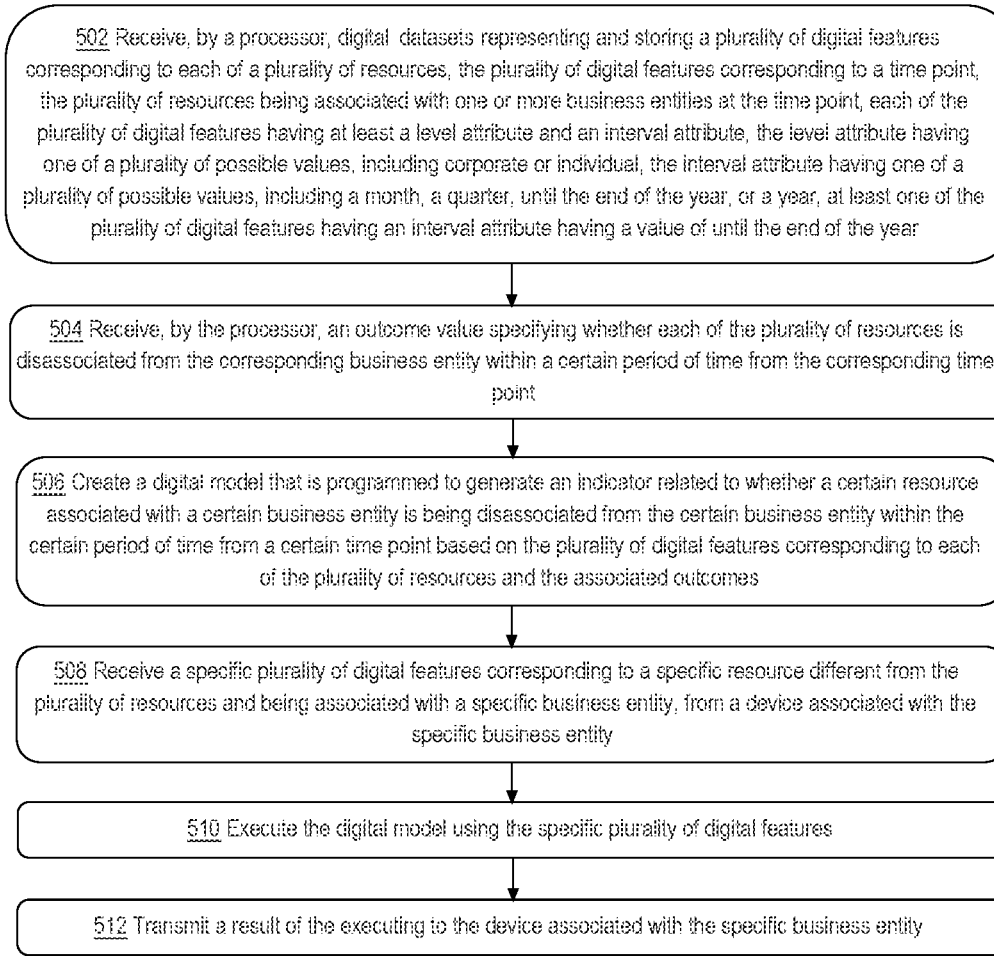
FIG. 5 illustrates an example process performed by the resource management server computer of managing resource attrition.

FIG. 5 illustrates an example process performed by the resource management server computer of managing resource attrition. FIG. 5 is shown in simplified, schematic format for purposes of illustrating a clear example and other embodiments may include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 502, the server 102 is programmed or configured to receive a plurality of digital features corresponding to each of a plurality of individuals. The plurality of features represents various factors related to an individual that might affect the individual's employment decision of whether to continue or stop working for a corresponding business entity within a certain period of time. The plurality of digital features corresponds to a time point, where the plurality of individuals are associated with one or more business entities at the time point. Each of the plurality of digital features has at least a level attribute and an interval attribute. The level attribute indicates to which entity the feature applies and has one of a plurality of possible values, including corporate or individual. The interval attribute indicates to what time interval the feature applies and has one of a plurality of possible values, including a month, a quarter, until the end of the year, or a year, with at least one of the plurality of digital features having an interval attribute having a value of until the end of the year. Each of the plurality of features can have additional attributes, such as a unit attribute, a category attribute, or an aggregate attribute.

In step 504, the server 102 is programmed or configured to receive an outcome of whether each the of plurality of individuals is being disassociated from the corresponding business entity within a certain period of time from the corresponding time point. For example, the plurality of features may correspond to one year ago, and the certain period of time may be eight months. The outcome would then indicate whether an individual who was associated with a corresponding business entity one year ago was still associated with that business entity four months ago.

In step 506, the server 102 is programmed or configured to create a digital model for providing an indicator related to whether a certain individual associated with a certain business entity is being disassociated from the certain business entity within the certain period of time from a certain time point based on the plurality of digital features corresponding to each of the plurality of individuals and the associated outcomes. The digital model can be implemented as a decision tree or forest, a logistic regression model, a neural network, and so on. The indicator can be a likelihood that the certain individual departs from the certain business entity, or a binary prediction of whether the certain individual departs from the certain business, within the certain period of time.

The digital model is then stored in memory for future use or transmitted to a remote device associated with a specific business entity.

In step 508, the server 102 is programmed or configured to receive a specific plurality of digital features corresponding to a specific individual, who is different from the plurality of individuals and is being associated with a specific business entity, from a device associated with the specific business entity. In step 510, the server 102 is programmed or configured to execute the digital model to generate the indicators using the specific plurality of digital features.

In step 512, the server 102 is programmed or configured to transmit a result of the executing to the device associated with the specific business entity. In addition to the indicator related to whether the specific individual is disassociated from the specific business entity within the certain period of time, the result can include explanations of how the indicator was determined, such as a selection of the specific plurality of features and their perceived significance. The server 102 can also be programmed or configured to prepare recommendations for improving resource attrition. For example, for those features that have been deemed to contribute to the specific individual's decision to leave the specific business entity, the recommendations may include improving their values for the specific individual with respect to certain group averages.

In some embodiments, when the digital model is transmitted to the device associated with the specific business entity, the specific plurality of features corresponding to the specific individual may be received by the device, which may then run the digital model on the specific features to obtain and further process the execution result.

6. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
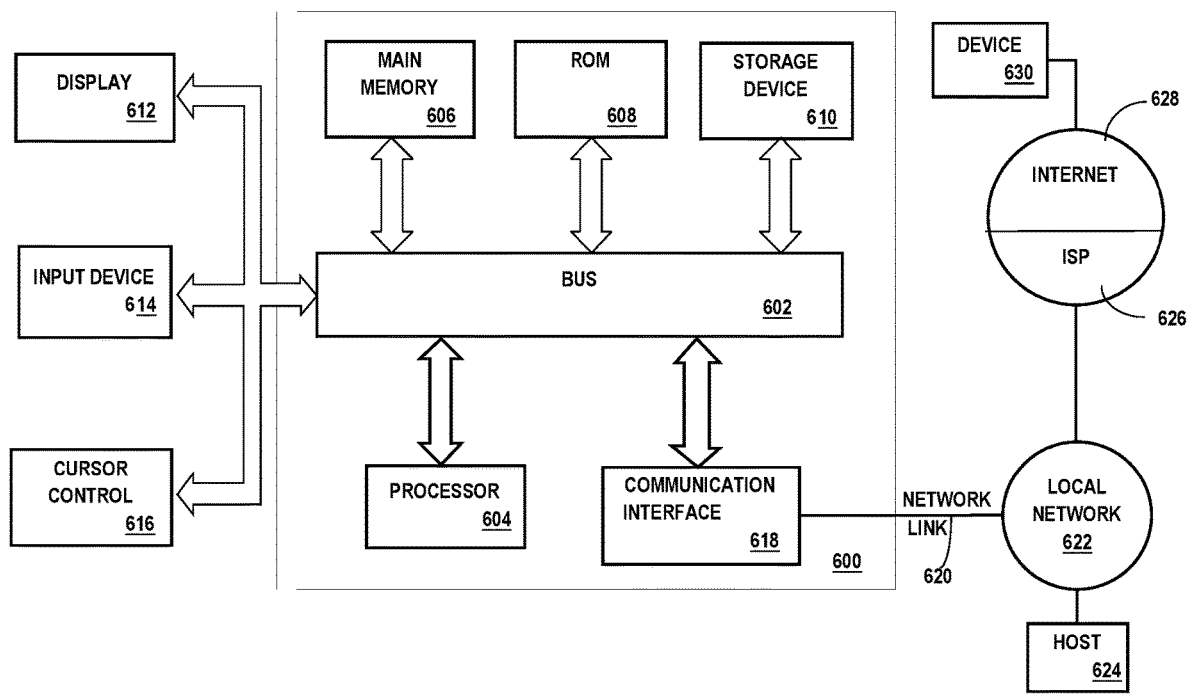
FIG. 6 illustrates a computer system upon which an embodiment may be implemented.

FIG. 6 illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of automatically identifying datasets predictive of potential resource attrition, comprising:

receiving, by a processor, digital datasets representing and storing a plurality of digital features corresponding to each of a plurality of resources, the plurality of digital features comprising at least: an identifier of a business entity; a number of months for which an individual received a salary payment in a current year or a past year; a home city of the individual; a number of months in a year in which a quota achieved by the individual was paid; an average number of monthly payees of the business entity; a minimum number of monthly payees of the business entity in a year; a maximum number of monthly payees of the business entity in a year;

the plurality of digital features corresponding to a time point, the plurality of resources being associated with one or more business entities at the time point, each of the plurality of digital features having at least a level attribute, an interval attribute, and an aggregate attribute, the level attribute having one of a plurality of values, including corporate or individual, at least one of the plurality of digital features having a level attribute having a value of corporate, the interval attribute having one of a plurality of values, including from a particular time point until an end of a calendar year, at least one of the plurality of digital features having an interval attribute having a value of from the particular time point until the end of the year;

receiving, by the processor, an outcome value specifying whether each of the plurality of resources is disassociated from the corresponding business entity within a certain period of time from the corresponding time point;

creating a training set comprising, for each of a plurality of resources, the corresponding plurality of digital features and the corresponding outcome value;

creating a digital model that is programmed to generate an indicator related to whether a certain resource associated with a certain business entity is disassociated from the certain business entity within the certain period of time from a certain time point based on the training set using a machine learning technique;

receiving a specific plurality of digital features corresponding to a specific resource different from the plurality of resources and being associated with a specific business entity, from a device associated with the specific business entity;

executing the digital model using the specific plurality of digital features;

transmitting a result of the executing to the device associated with specific business entity.

2. The computer-implemented method of claim 1, each of the plurality of digital features having a category attribute having one of a plurality of values, including commission structures related to quota and credits or work products related orders, sales, or productivity.

3. The computer-implemented method of claim 1, each of the plurality of digital features having an aggregate attribute having one of a plurality of values, including sum, maximum, minimum, medium, average, median, count, recency, frequency of changes, or number of changes.

4. The computer-implemented method of claim 1, the plurality of values for the interval attribute further including a year, a quarter, a month, monthly over a year, until year end, or until now.

5. The computer-implemented method of claim 1, the digital model being implemented as a logistic regression model, a decision tree, gradient boosting trees, or a neural network.

6. The computer-implemented method of claim 1, when the digital model is implemented as a decision tree,
the creating comprising building a split table having one row for each node of the decision tree,
the executing comprising reading select rows of the split table.

7. The computer-implemented method of claim 1, the result of the executing indicating a likelihood that the specific resource is disassociated from the specific business entity within the certain period of time.

8. The computer-implemented method of claim 7, the result of the executing further including one or more reasons supporting the likelihood.

9. The computer-implemented method of claim 1,
the executing producing a likelihood that the specific resource is disassociated from the specific business entity within the certain period of time,
the result to be displayed including an alert when the likelihood is above a certain threshold.

10. The computer-implemented method of claim 1, further comprising:
determining a recommendation related to the specific resource based on the result of the executing;
transmitting the recommendation to the device associated with the specific business entity.

11. The computer-implemented method of claim 1, further comprising:
the specific plurality of digital features corresponding to a specific time point,
receiving an outcome of whether the specific resource is disassociated from the specific business entity within the certain period from the specific time point;
updating the digital model with the specific plurality of digital features and the outcome of the specific resource.

12. One or more non-transitory storage media storing instructions which, when executed by one or more computing devices, cause performance of a method, the method comprising:
receiving digital datasets representing and storing a plurality of digital features corresponding to each of a plurality of resources,
the plurality of digital features comprising at least: an identifier of a business entity; a number of months for which an individual received a salary payment in a current year or a past year; a home city of the individual; a number of months in a year in which a quota achieved by the individual was paid; an average number of monthly payees of the business entity; a minimum number of monthly payees of the business entity in a year; a maximum number of monthly payees of the business entity in a year;
the plurality of digital features corresponding to a time point,
the plurality of resources being associated with one or more business entities at the time point,
each of the plurality of digital features having at least a level attribute, an interval attribute, and an aggregate attribute,
the level attribute having one of a plurality of values, including corporate or individual,
at least one of the plurality of digital features having a level attribute having a value of corporate,
the interval attribute having one of a plurality of values, including from a particular time point until an end of a calendar year,
at least one of the plurality of digital features having an interval attribute having a value of from a particular time point until the end of the year;
receiving an outcome value specifying whether each of the plurality of resources is disassociated from the corresponding business entity within a certain period of time from the corresponding time point;
creating a training set comprising, for each of a plurality of resources, the corresponding plurality of digital features and the corresponding outcome value;
creating a digital model that is programmed to generate an indicator related to whether a certain resource associated with a certain business entity is disassociated from the certain business entity within the certain period of time from a certain time point based on the training set using a machine learning technique;
receiving a specific plurality of digital features corresponding to a specific resource different from the plurality of resources and being associated with a specific business entity, from a device associated with the specific business entity;
executing the digital model using the specific plurality of digital features;
transmitting a result of the executing to the device associated with specific business entity.

13. A computer-implemented method of automatically identifying datasets predictive of potential resource attrition, comprising:
receiving, by a processor, multiple digital items corresponding to a plurality of resources,
the multiple digital items covering a finite time range;
the plurality of resources being associated with one or more business entities during the time range,
each of the multiple digital items corresponding to one of the plurality of resources;
each of the multiple digital items having a level attribute having a value of corporate or resource;
receiving, by the processor, a plurality of outcomes respectively corresponding to the plurality of resources, each outcome indicating whether the resource is disassociated from the corresponding business entity at an ending time point at or after an end of the time range;
causing display of an option to add a feature definition;
causing, for an added feature definition, display of an option to add one or more attributes,
the one or more attributes including a level attribute and an aggregate attribute,
causing, for the level attribute, display of a first plurality of values for selection, including individual and corporate;
causing, for the aggregate attribute, display of a second plurality of values for selection, including a number of changes;
causing display of an option to select a beginning time point as a beginning of a value of the interval attribute;
generating a plurality of digital features for each of the plurality of resources by applying added feature definitions to the multiple digital items;
the plurality of digital features comprising at least: an identifier of a business entity; a number of months for which an individual received a salary payment in a current year or a past year; a home city of the individual; a number of months in a year in which a quota achieved by the individual was paid; an average number of monthly payees of the business entity; a minimum number of monthly payees of the business entity in a year; a maximum number of monthly payees of the business entity in a year;

creating a training set comprising, for each of a plurality of resources, the corresponding plurality of digital features and the corresponding outcome value;

creating, by the processor, a digital model that is programmed to generate an indicator related to whether a certain resource associated with a certain business entity is disassociated from the certain business entity within a certain period of time from a certain time point based on the training set using a machine learning technique;

in response to receiving a specific plurality of digital features corresponding to a specific resource different from the plurality of resources and being associated with a specific business entity, causing executing the digital model using the specific plurality of digital features and causing display of a result of the executing.

14. The computer-implemented method of claim 13, further comprising transmitting the digital model to a remote device associated with the specific business entity, the specific plurality of digital features being received by the remote device, the digital model being executed and the result of the executing being displayed by the remote device.

15. The computer-implemented method of claim 13, further comprising:

causing, for the added feature definition, display of an option to indicate a score, the creating being based on one or more scores indicated for or one or more added feature definitions.

16. The computer-implemented method of claim 13, the multiple digital items respectively having multiple datatypes, the one or more attributes including a type attribute, further comprising causing, for the type attribute, display of the multiple datatypes as values for selection.

17. The computer-implemented method of claim 13, the certain period of time being the difference between the ending time point and the beginning time point.

18. The computer-implemented method of claim 13, the value of the interval attribute being included in the time range.

19. The computer-implemented method of claim 13, the second plurality of values for the aggregate attribute further including sum, maximum, minimum, average, median, count, recency, frequency of changes, or number of changes.

20. The computer-implemented method of claim 13, each of the plurality of digital features having an interval attribute having one of a plurality of values, including a year, a quarter, a month, monthly over a year, until year end or until now.

* * * * *